(12) United States Patent
Park (10) Patent No.: US 12,500,453 B2
(45) Date of Patent: Dec. 16, 2025

(54) RF SIGNAL CONVERSION DEVICE

(71) Applicant: VISION AI CO., LTD, Seoul (KR)

(72) Inventor: Min Sik Park, Goyang-si (KR)

(73) Assignee: VISION AI CO., LTD., Seoul (KR)

( * ) Notice: Subject to any disclaimer, the term of this patent is extended or adjusted under 35 U.S.C. 154(b) by 340 days.

(21) Appl. No.: 18/186,841

(22) Filed: Mar. 20, 2023

(65) Prior Publication Data

US 2024/0097497 A1   Mar. 21, 2024

(30) Foreign Application Priority Data

Sep. 20, 2022   (KR) .................... 10-2022-0118284
Feb. 10, 2023   (KR) .................... 10-2023-0018349

(51) Int. Cl.
*H02J 50/20*   (2016.01)
*H04B 5/77*   (2024.01)
*H04B 5/79*   (2024.01)

(52) U.S. Cl.
CPC ............... *H02J 50/20* (2016.02); *H04B 5/77* (2024.01); *H04B 5/79* (2024.01)

(58) Field of Classification Search
CPC .................................. H02J 50/20; H04B 5/77
See application file for complete search history.

(56) References Cited

FOREIGN PATENT DOCUMENTS

| CN | 101140614 A | * | 3/2008 |
| KR | 101132737 B1 | | 4/2012 |
| WO | WO-2009140806 A1 | * | 11/2009 |
| WO | WO-2021141447 A1 | * | 7/2021 |

* cited by examiner

*Primary Examiner* — Yuwen Pan
(74) *Attorney, Agent, or Firm* — Rabin & Berdo, P.C.

(57) ABSTRACT

An RF signal conversion device according to an embodiment of the present invention may convert a signal of a user terminal into a signal that can be processed by an RF card reader, and convert radio waves around an antenna unit into DC electricity to be used as power.

10 Claims, 5 Drawing Sheets

RF SIGNAL CONVERSION DEVICE

BACKGROUND OF THE INVENTION

Field of the Invention

The present invention relates to an RF signal conversion device.

Background of the Related Art

As mobile IDs using a smartphone gradually spread as a means for identity confirmation and access control, they are spotlighted as a next-generation authentication means that replaces current RF cards. As the Ministry of Public Administration and Security adopts mobile IDs of civil servants in full scale, the era of integrated digital ID covering online and offline spaces is coming.

However, a large number of access control systems need to be replaced with a device capable of communicating with user terminals in order to utilize mobile IDs using an RF card reader, and this will require a lot of time and money.

SUMMARY OF THE INVENTION

Therefore, the present invention has been made in view of the above problems, and it is an object of the present invention to provide an RF signal conversion device for converting a terminal signal into an RF signal.

The problems of this application are not limited to the problems mentioned above, and unmentioned other problems will be clearly understood by those skilled in the art from the following description.

To accomplish the above object, according to one aspect of the present invention, there is provided an RF signal conversion device comprising: a first antenna configured to transmit a terminal confirmation signal for confirming a user terminal and receive a terminal signal transmitted from the user terminal in response to the terminal confirmation signal, and receive ambient radio waves after reception of the terminal signal is completed; a conversion unit configured to convert the ambient radio waves received through the first antenna into DC electricity; an energy storage unit configured to store the DC electricity output from the conversion unit; a control unit configured to operate using the DC electricity stored in the energy storage unit, output the terminal confirmation signal, and convert the terminal signal received through the first antenna into a first RF signal that can be processed by an RF card reader; a first switch configured to be connected to the first antenna, and form a path for transmitting the terminal signal to the control unit through the first antenna after the terminal confirmation signal is output to the first antenna, and a path for transmitting the ambient radio waves to the conversion unit after the control unit checks completion of receiving the terminal signal; a second switch configured to form a path for transmitting the first RF signal to the RF card reader under the control of the control unit; and a second antenna configured to be connected to the second switch to emit the first RF signal transmitted through the second switch to the RF card reader.

After checking completion of receiving the terminal signal, the control unit may control the second switch to transmit the second RF signal for an operation of the RF card, which is received from the RF card reader through the second antenna, to the conversion unit.

The control unit may control the first switch to transmit the terminal confirmation signal through the first antenna before receiving the terminal signal transmitted from the user terminal, and receive the terminal signal corresponding to the terminal confirmation signal through the first antenna while maintaining a switching state of the first switch.

In a third section after a first section of transmitting the terminal confirmation signal and a second section of receiving the terminal signal, the control unit may change the switching state of the first switch to transmit the ambient radio waves to the conversion unit through the first antenna.

The RF signal conversion device may further comprise a housing unit provided with the first antenna, the second antenna, the conversion unit, the energy storage unit, the control unit, the first switch, and the second switch, wherein
the housing unit may be configured to be attached to a surface of the RF card reader where an RF card may approach or contact.

The RF signal conversion device may further comprise a relay antenna configured to transfer an RF card signal of the RF card to the RF card reader, wherein the relay antenna may be provided in the housing unit.

The RF signal conversion device may further comprise a photovoltaic cell for converting external light into electrical energy, wherein the photovoltaic cell may be configured to transfer the converted electrical energy to the conversion unit.

According to another aspect of the present invention, there is provided an RF signal conversion device comprising: an antenna unit configured to receive a terminal signal transmitted from a user terminal and receive ambient radio waves after reception of the terminal signal is completed; a conversion unit configured to convert the ambient radio waves received through the antenna unit into DC electricity; an energy storage unit configured to store the DC electricity output from the conversion unit; a control unit configured to operate using the DC electricity stored in the energy storage unit, and convert the terminal signal received through the antenna unit into a first RF signal that can be processed by an RF card reader; and a switching unit configured to be connected to the antenna unit, and form a path for transmitting the first RF signal to the RF card reader under the control of the control unit, and a path for the control unit to transmit the ambient radio waves to the conversion unit after checking completion of receiving the terminal signal.

The switching unit may be configured to form a path for transmitting a second RF signal transmitted from the RF card reader to the conversion unit after completion of receiving of the terminal signal is checked.

The RF signal conversion device according to another aspect of the present invention may further comprise a housing unit provided with the antenna unit, the conversion unit, the energy storage unit, the control unit, and the switching unit, wherein the housing unit may be configured to be attached to a surface of the RF card reader where an RF card may approach or contact.

The RF signal conversion device according to another aspect of the present invention may further comprise a relay antenna configured to transfer an RF card signal of the RF card to the RF card reader, wherein the relay antenna may be provided in the housing unit.

The RF signal conversion device according to another aspect of the present invention may further comprise a photovoltaic cell for converting external light into electrical energy, wherein the photovoltaic cell may be configured to transfer the converted electrical energy to the conversion unit.

DETAILED DESCRIPTION OF THE PREFERRED EMBODIMENT

Hereinafter, embodiments of the present invention will be described in detail with reference to the accompanying drawings. However, the accompanying drawings are described only to disclose the contents of the present invention more easily, and those skilled in the art may easily understand that the scope of the present invention is not limited to the scope of the accompanying drawings.

In addition, the terms used in this application are used only to describe specific embodiments, and are not intended to limit the present invention. Singular expressions include plural expressions unless the context clearly dictates otherwise.

In this application, it should be understood that terms such as "comprise" or "having" are intended to designate that there is a feature, a number, a step, an operation, a component, a part, or a combination thereof described in the specification, and do not preclude the possibility of presence or addition of one or more other features, numbers, steps, operations, components, parts, or combinations thereof.

Figure 1:
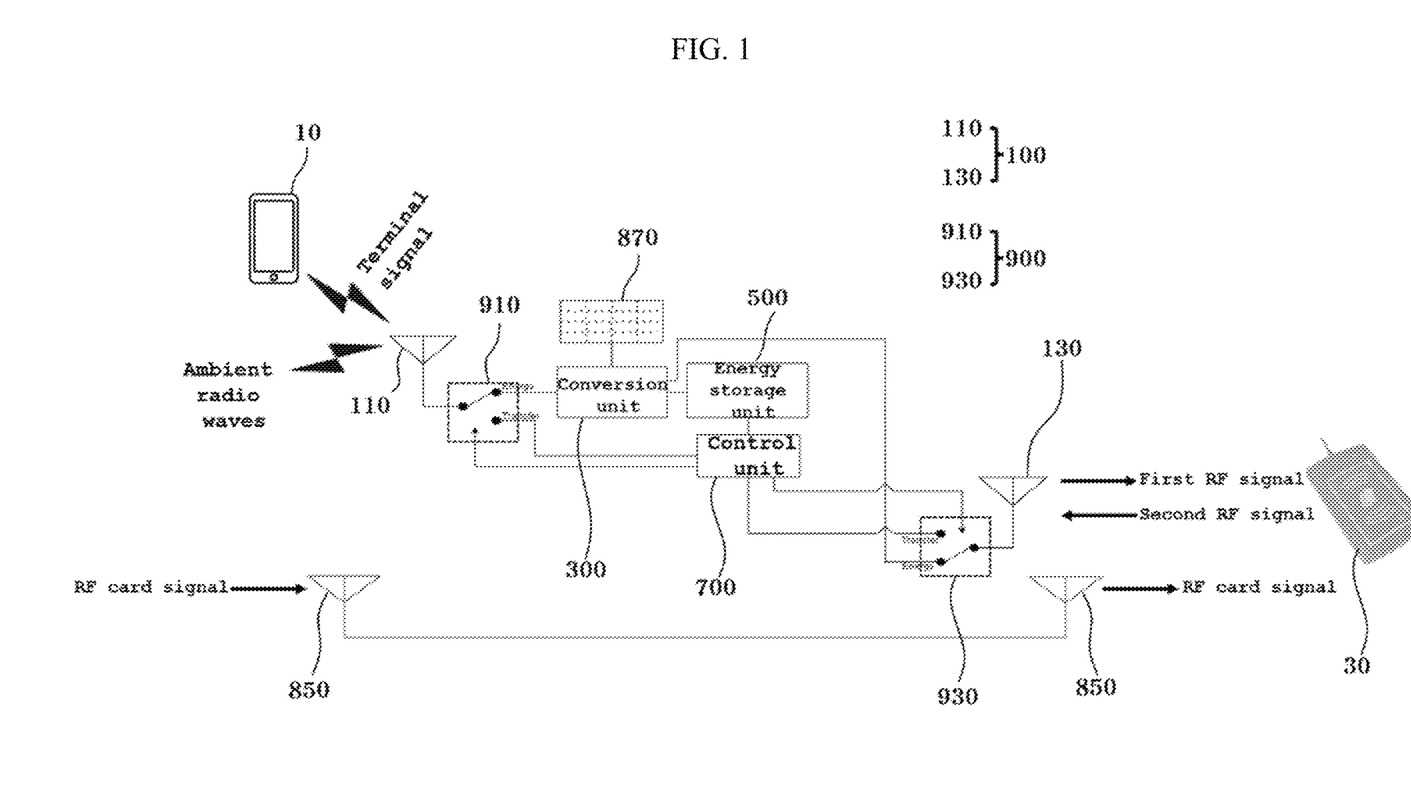
FIGS. 1 to 3 are views showing an RF signal conversion device according to an embodiment of the present invention.

FIG. 1 is a view showing an RF signal conversion device (hereinafter, referred to as a conversion device) according to an embodiment of the present invention. As shown in FIG. 1, the RF signal conversion device according to an embodiment of the present invention includes an antenna unit 100, a conversion unit 300, an energy storage unit 500, a control unit 700, and a switching unit 900.

The antenna unit 100 is configured to receive a terminal signal transmitted from the user terminal 10 and receive radio waves around the antenna unit 100 after reception of the terminal signal is completed.

The antenna unit 100 may be used to collect energy of the radio waves around the antenna unit 100 and signals of an RF card reader 30, as well as communicating with the user terminal 10. This will be described below in more detail.

The conversion unit 300 is configured to convert the ambient radio waves received through the antenna unit 100 into DC electricity. The ambient radio waves and the signal of the RF card reader 30 include AC electrical components, and the conversion unit 300 may include an AC/DC converter capable of converting the AC electrical components into DC electricity. Hereinafter, the signal of the RF card reader 30 will be expressed as a second RF signal.

The energy storage unit 500 is configured to store the DC electricity output from the conversion unit 300. The energy storage unit 500 may include a supercapacitor. Although the supercapacitor may have a capacity of several tens of mF, the present invention is not limited thereto.

As the supercapacitor is included in the present invention, power can be supplied from the energy storage unit 500 for 1 minute or longer without input of power when it is fully charged. Accordingly, since the conversion device of the present invention may operate without a separate battery and does not include a separate battery, the volume, weight, and manufacturing cost can be reduced.

The control unit 700 is configured to operate using the DC electricity stored in the energy storage unit 500. That is, the energy storage unit 500 may function as a power source of the present invention.

The control unit 700 is configured to convert the terminal signal received through the antenna unit 100 into a first RF signal that can be processed by the RF card reader 30. To this end, the control unit 700 may convert the terminal signal into a first RF signal.

The terminal signal may be a signal output from a short-range communication module such as a Bluetooth module of the user terminal 10 (e.g., smart phone, tablet computer, laptop computer, wearable device, or the like).

In order for the control unit 700 to receive the terminal signal, the conversion device according to an embodiment of the present invention and the user terminal 10 may be connected through Bluetooth. The Bluetooth connection between the conversion device according to an embodiment of the present invention and the user terminal 10 will be described below in detail.

After the Bluetooth connection, the control unit 700 may generate a baseband analog signal by down-converting the frequency band of the terminal signal, and generate a digital signal by analog-to-digital conversion of the baseband analog signal.

The control unit 700 may convert data included in the digital signal into RFID card data that can be processed by the RF card reader 30. At this point, although the control unit 700 may generate the RFID card data according to the ISO/IEC 14443 standard, the present invention is not limited to the standard.

The control unit 700 converts the converted RFID card data into a first RF signal of an analog signal form through digital-to-analog conversion.

The frequency band of the terminal signal transmitted from the short-range communication module may be several GHz, and the frequency band of the first RF signal may be several tens of MHz. In addition, the frequency bands of the second RF signal and an RF card signal described below may also be several tens of MHz.

The information that the terminal signal has may include information transmitted from an existing RF card to the RF card reader 30. For example, although the terminal signal may include information related to access authentication or information on a credit card transaction, the present invention is not limited thereto.

The control unit 700 may be driven through the power of the energy storage unit 500. The control unit 700 may check the amount of power of the energy storage unit 500, and when the amount of power is lower than a reference value, it may control the switching unit 900 to prioritize energy collection over signal transmission and reception.

The control unit 700 may be implemented in the form of a system-on-chip (SoC), and the SoC is a device that integrates an MCU, memory, and the like into a chip. The present invention is not limited to the control unit 700 of a SoC type.

The switching unit 900 is configured to be connected to the antenna unit 100, and form a path for transmitting the first RF signal to the RF card reader 30 under the control of the control unit 700, and a path for the control unit 700 to transmit the ambient radio waves to the conversion unit 300 after checking completion of receiving the terminal signal.

The information included in the terminal signal may include at least one among information on the data length and information on completion of data transmission. The control unit 700 may check completion of receiving the terminal signal by confirming at least one among information on the data length and information on completion of data transmission from the digital signal generated through analog-to-digital conversion.

The control unit 700 may check completion of receiving the terminal signal by comparing information on the length of data with the length of actually received data. In addition, the control unit 700 may check completion of receiving the terminal signal by confirming information on completion of transmitting the data included in the terminal signal.

The switching unit 900 may be configured to perform a switching operation for receiving the terminal signal and transmitting the first RF signal to the RF card reader 30 under the control of the control unit 700.

In addition, the switching unit 900 is configured to perform a switching operation for transmitting the ambient radio waves and the second RF signal transmitted from the RF card reader 30 to the conversion unit 300 under the control of the control unit 700 after the control unit 700 checks completion of receiving the terminal signal.

The ambient radio waves may be emitted from various electrical/electronic devices around the first antenna 110 of the antenna unit 100. The frequency band of the ambient radio waves collected through the antenna unit 100 may be a frequency band that can be collected by the first antenna 110.

For example, although the first antenna 110 may be an antenna for an industrial scientific and medical equipment (ISM) band, the present invention is not limited thereto. When the first antenna 110 is an antenna for the ISM band, the first antenna 110 may collect radio waves in a band of hundreds of MHz or radio waves in a band of several GHz.

In this way, the present invention may provide power needed to convert the terminal signal into the first RF signal without a separate battery. To this end, the present invention may convert the energy of the ambient radio waves and the second RF signal transmitted from the RF card reader 30 into DC electricity and store the DC electricity.

That is, since the conversion device according to an embodiment of the present invention uses a plurality of energy sources (e.g., ambient radio waves and second RF signal), the terminal signal may be converted into the first RF signal more stably.

Through this, an infrastructure for utilizing mobile IDs or mobile payment in place of RF cards may be constructed and spread without replacing existing RF card readers 30.

Figure 2:
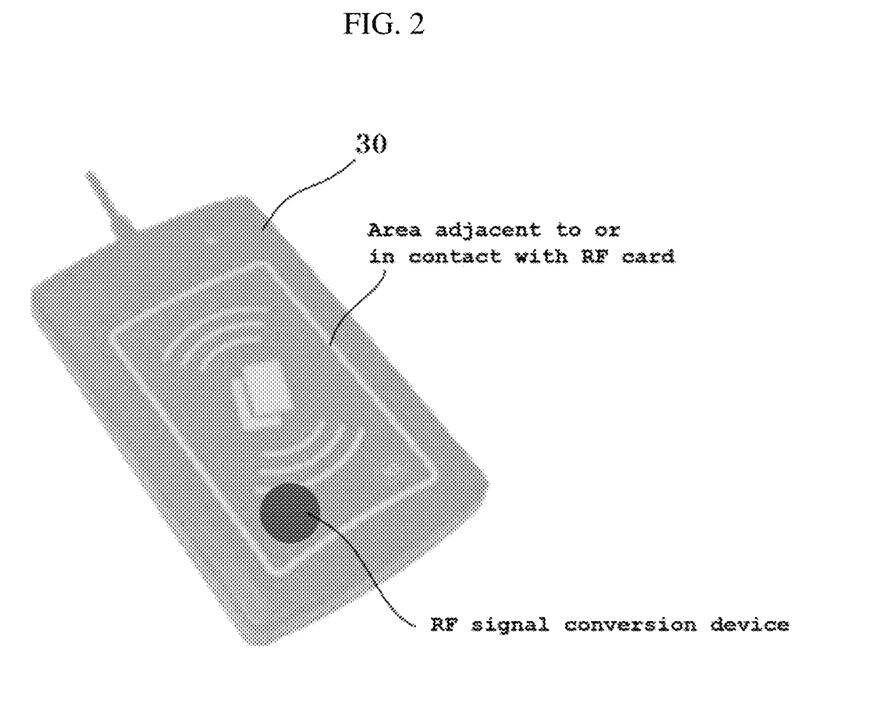
Figure 3:
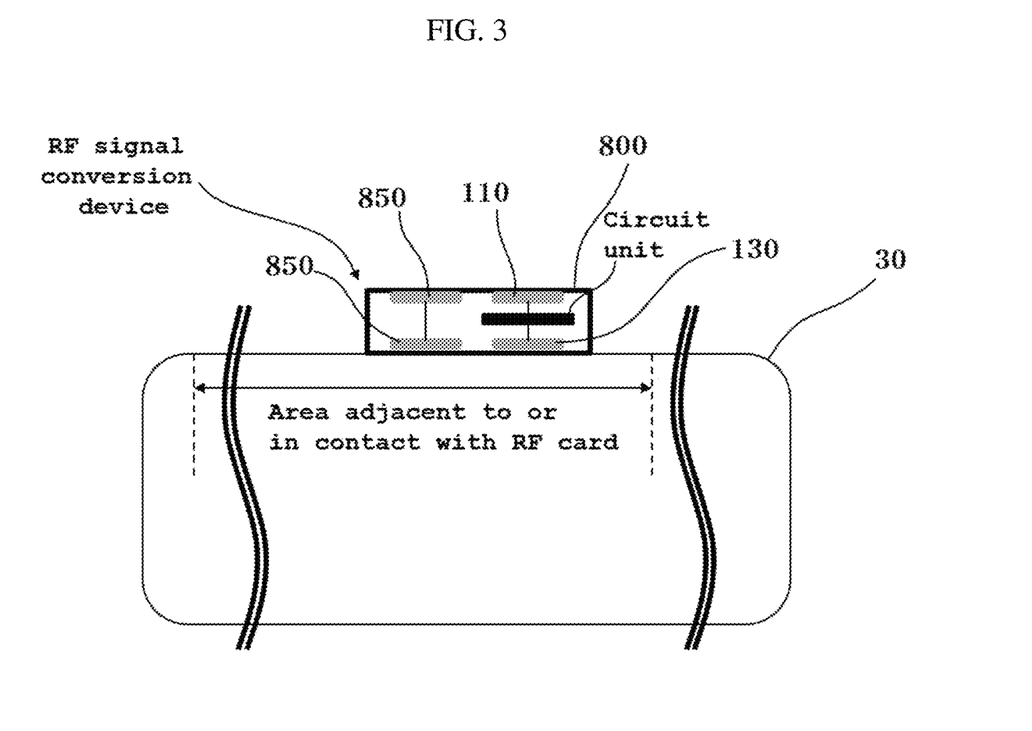

Meanwhile, as shown in FIGS. 2 and 3, the conversion device according to an embodiment of the present invention may further include a housing unit 800 provided with the antenna unit 100, the conversion unit 300, the energy storage unit 500, the control unit 700, and the switching unit 900.

The housing unit 800 may be attached to the surface of the RF card reader 30 where an RF card may approach or contact. In FIG. 3, a circuit unit may include the antenna unit 100, the conversion unit 300, the energy storage unit 500, the control unit 700, and the switching unit 900.

Accordingly, since the conversion device according to an embodiment of the present invention may be easily attached to and detached from many RF card readers 30 installed previously, the cost required to construct an infrastructure for utilizing mobile IDs or mobile payment may be reduced.

Attachment of the housing unit 800 may be accomplished in various ways. The housing unit 800 may be attached to the RF card reader 30 by an adhesive agent or an adhesive tape, and a structure for attaching and detaching the housing unit 800 to and from the RF card reader 30 may be provided in the RF card reader 30 or the housing unit 800.

Meanwhile, the conversion device according to an embodiment of the present invention may further include a relay antenna 850 configured to transfer the RF card signal of the RF card to the RF card reader 30. The relay antenna 850 may be provided in the housing unit 800.

As shown in FIGS. 2 and 3, the conversion device according to an embodiment of the present invention may be attached to the surface of the RF card reader 30 where an RF card may approach or contact. Accordingly, the conversion device according to an embodiment of the present invention may interfere with RF communication between the RF card and the RF card reader 30.

To prevent the interference, a relay antenna 850 capable of relaying signal transmission and reception between the RF card and the RF card reader 30 may be provided in the housing unit 800. At this point, the relay antenna 850 may be provided in the housing unit 800 to be spaced apart from the circuit unit in order to avoid interference with the circuit unit.

In addition, as shown in FIG. 3, one relay antenna 850 may be provided to be adjacent to an area of the RF card reader 30 where an RF card may approach or contact, and another relay antenna 850 may be provided on the opposite side of the one relay antenna 850. Accordingly, an RF card may be adjacent to or in contact with another relay antenna 850, and the RF signal of the RF card may smoothly reach the RF card reader 30 through another relay antenna 850.

Meanwhile, as shown in FIG. 1, the antenna unit 100 may include a first antenna 110 and a second antenna 130. In addition, the switching unit 900 may include a first switch 910 and a second switch 930.

The first antenna 110 transmits a terminal confirmation signal for confirming the user terminal 10 and receives a terminal signal transmitted from the user terminal 10 in response to the terminal confirmation signal. In addition, the first antenna 110 receives radio waves around the first antenna 110 after reception of the terminal signal is completed.

That is, the first antenna 110 may receive ambient radio waves and the terminal signal transmitted from the user terminal 10.

The terminal confirmation signal may be used to confirm a user terminal 10 capable of transmitting the terminal signal and inform the user terminal 10 that the conversion device of the present invention is ready to receive the terminal signal.

The conversion unit 300 is configured to convert the ambient radio waves received through the first antenna 110 into DC electricity.

The energy storage unit 500 is configured to store the DC electricity output from the conversion unit 300.

Since the conversion unit 300 and the energy storage unit 500 are described above in detail, description thereof will be omitted.

The control unit 700 is configured to operate using the DC electricity stored in the energy storage unit 500, output the terminal confirmation signal, and convert the terminal signal received through the first antenna 110 into a first RF signal that can be processed by the RF card reader 30.

The first switch 910 is configured to be connected to the first antenna 110, and form a path for transmitting the terminal signal to the control unit 700 through the first antenna 110 under the control of the control unit 700 after the terminal confirmation signal is output to the first antenna 110. In addition, the first switch 910 is configured to form a path for transmitting the ambient radio waves to the conversion unit 300 under the control of the control unit 700 after the control unit 700 checks completion of receiving the terminal signal.

That is, the control unit 700 may let the ambient radio waves transmitted to the conversion unit 300 through the first antenna 110 by switching the first switch 910 after the control unit 700 checks completion of receiving the terminal signal.

The second switch 930 is configured to form a path for transmitting the first RF signal to the RF card reader under the control of the control unit 700. The second antenna 130 is configured to be connected to the second switch 930 to emit the first RF signal transmitted through the second switch 930 to the RF card reader 30.

Meanwhile, after checking completion of receiving the terminal signal, the control unit 700 may control the second switch 930 to transfer the second RF signal for the operation of the RF card, which is received from the RF card reader 30 through the second antenna 130, to the conversion unit 300.

The RF card may not have a power source for outputting the RF signal. The RF card may receive the second RF signal transmitted from the RF card reader 30 and output an RF signal using the energy of the received second RF signal.

The conversion device according to an embodiment of the present invention may convert the second RF signal transmitted from the RF card reader 30 into DC electricity through the operation of the second switch 930 and the conversion unit 300, and the converted DC electricity may be stored in the energy storage unit 500.

Meanwhile, the control unit 700 may control the first switch 910 to transfer the terminal confirmation signal through the first antenna 110 before receiving the terminal signal transmitted from the user terminal 10.

Figure 4:
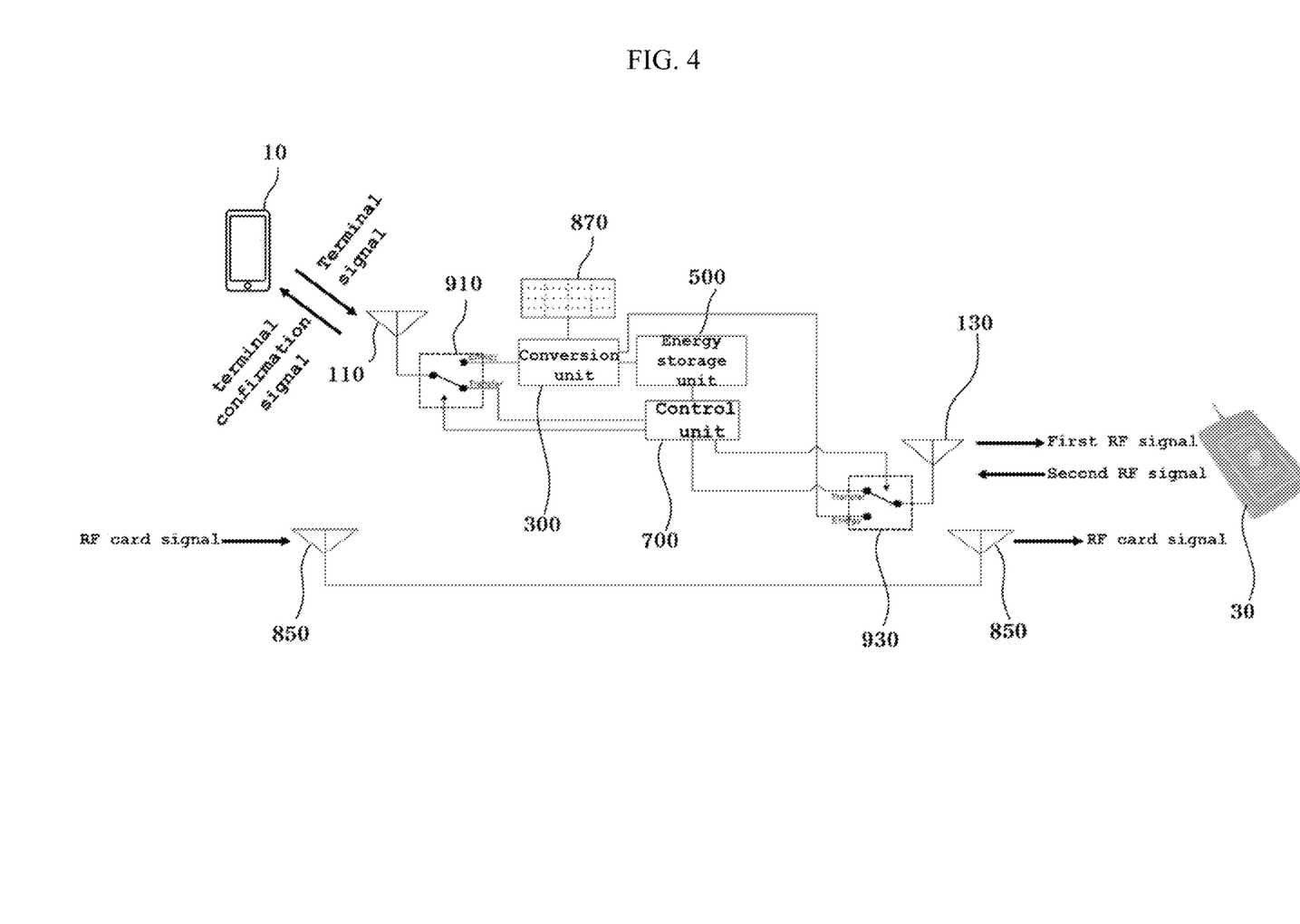
FIG. 4 is a view showing switching states of a first switch and a second switch for transmitting and receiving a terminal confirmation signal and a terminal signal.

In order to transmit the terminal confirmation signal and receive the terminal signal, the first switch 910 may be switched to electrically connect the control unit 700 and the first antenna 110 as shown in FIG. 4. Accordingly, the control unit 700 may receive the terminal signal through the first antenna 110.

The terminal confirmation signal may be transmitted according to a set cycle. For example, although the conversion device according to an embodiment of the present invention and the user terminal 10 are for Bluetooth connection and may transmit the terminal confirmation signal according to the advertising cycle of Blue-tooth Low Energy (BLE), the conversion device of the present invention is not limited to the advertising cycle.

The terminal confirmation signal may include address information and access-related information of the conversion device according to an embodiment of the present invention. The access-related information may include mode information, service-specific ID information, and device name information of the conversion device according to an embodiment of the present invention.

The user terminal 10 receiving the terminal confirmation signal may transmit a connection request signal to the conversion device according to an embodiment of the present invention using the address information and connection-related information.

After receiving the connection request signal through the first antenna 110 and the first switch 910, the control unit 700 may connect to the user terminal 10 by transmitting an ACK signal to the user terminal 10 to perform communication.

After the conversion device according to an embodiment of the present invention and the user terminal 10 are connected to communicate, the control unit 700 may receive the terminal signal from the user terminal 10 through the first antenna 110 while maintaining the switching state of the first switch 910.

That is, the first switch 910 may maintain the state of electrically connecting the first antenna 110 and the control unit 700. The user terminal 10 may transmit the terminal signal, and the control unit 700 may receive the terminal signal through the first antenna 110 and the first switch 910.

The control unit 700 may convert the received terminal signal into a first RF signal and transmit the first RF signal to the RF card reader 30 through the second switch 930 and the second antenna 130. To this end, the second switch 930 may be switched to electrically connect the control unit 700 and the second antenna 130 under the control of the control unit 700.

Figure 5:
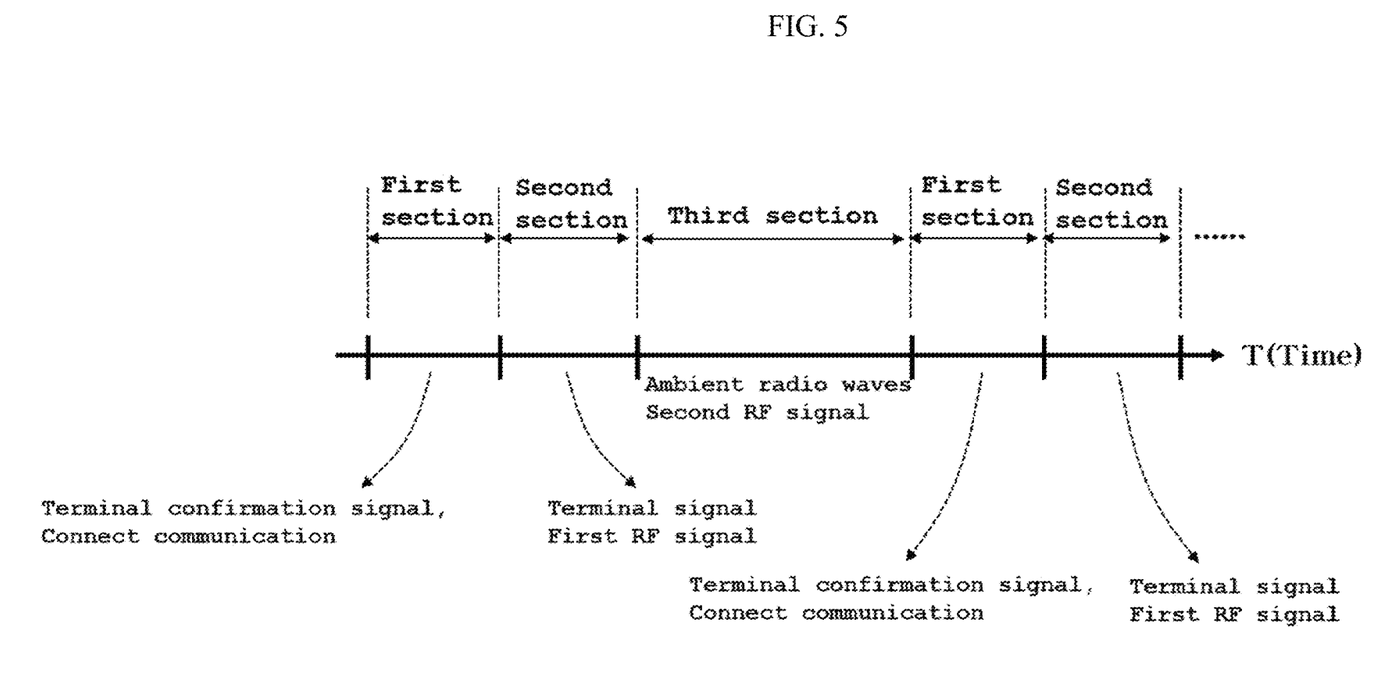
FIG. 5 is a view showing a third section for collecting energy of ambient radio waves.

Meanwhile, as shown in FIG. 5, in the first section, the conversion device of the present invention and the user terminal 10 may be connected to communicate according to transmission of the terminal confirmation signal.

In the second section, reception of the terminal signal, conversion of the received terminal signal into the first RF signal, and transmission of the converted first RF signal to the RF card reader through the second switch and the second antenna may be accomplished.

In addition, in the second section, the terminal signal may be converted into the first RF signal, and the control unit 700 may control the second switch 930 to transmit the first RF signal to the RF card reader 30 through the second antenna 130.

In the third section after the second section, the control unit 700 may change the switching state of the first switch 910 to transmit the radio waves around the first antenna 110 to the conversion unit 300 through the first antenna 110.

That is, after checking completion of receiving the terminal signal, the control unit 700 may control the first switch 910 to transmit the ambient radio waves collected by the first antenna 110 to the conversion unit 300 through the first antenna 110. The conversion unit 300 may convert the ambient radio waves into DC electricity and the energy storage unit 500 stores the converted DC electricity. Accordingly, reception of the terminal signal and conversion into the first RF signal may not be performed.

In addition, in the third section, after checking completion of receiving the terminal signal, the control unit 700 may control switching of the second switch 930 to receive the second RF signal through the second antenna 130.

The second RF signal may be transmitted to the conversion unit 300, and the conversion unit 300 may convert the second RF signal, as well as the ambient radio waves, into DC electricity and the energy storage unit 500 may store the converted DC electricity.

After the third section, the first section may start again as the conversion device according to an embodiment of the present invention outputs a terminal confirmation signal according to the set cycle.

As described above, the conversion device according to an embodiment of the present invention may operate without a separate battery by converting the second RF signal transmitted from the RF card reader 30, as well as the ambient radio waves, into DC electricity and using the DC electricity.

As described with reference to FIG. 5, in the first section, the user terminal 10 and the conversion device according to an embodiment of the present invention may be connected to communicate according to the terminal confirmation signal.

Unlike this, in the first section, the user terminal 10 may not respond to the terminal confirmation signal in a way of not transmitting a connection request signal. When the connection request signal is not received from the user terminal 10 during a set time period, the control unit 700 may perform switching control on the first switch 910 and the second switch 930.

Accordingly, as the first switch 910 and the second switch 930 are switched, the ambient radio waves and the second RF signal received through the first antenna 110 and the second antenna 130 may be transmitted to the conversion unit 300. The conversion unit 300 may convert AC electrical components of the ambient radio waves and the second RF signal into DC electricity, and the energy storage unit 500 may store the DC electricity.

Meanwhile, as shown in FIGS. 1 and 4, a photovoltaic cell 870 for converting external light into electrical energy according to an embodiment of the present invention may be further included. The photovoltaic cell 870 may transfer the converted electrical energy to the conversion unit 300.

The conversion unit 300 may convert the converted electrical energy into DC electricity and store the DC electricity in the energy storage unit 500. To this end, the conversion unit 300 may operate according to a Maximum Power Point Tracking (MPPT) algorithm. In addition, the photovoltaic cell 870 may convert indoor light energy, as well as solar light, into electrical energy.

Accordingly, energy for driving the conversion device of the present invention may be stably stored in the energy storage unit 500.

As the RF signal conversion device according to an embodiment of the present invention converts and stores the energy of a noise signal or a second RF signal transmitted from an RF card reader into DC electricity, power needed to convert the terminal signal into a first RF signal may be provided without a separate battery.

The effects of this application are not limited to the effects mentioned above, and unmentioned other effects will be clearly understood by those skilled in the art from the following description.

As described above, the embodiments according to the present invention have been reviewed, and the fact that the present invention can be embodied in other specific forms, in addition to the embodiments described above, without departing from the spirit or scope is apparent to those skilled in the art. Therefore, the embodiments described above should be regarded as illustrative rather than restrictive, and thus the present invention is not limited to the above description, and may vary within the scope of the appended claims and their equivalents.

DESCRIPTION OF SYMBOLS

10: User terminal
30: RF card reader
100: Antenna unit
110: First antenna
130: Second antenna
300: Conversion unit
500: Energy storage unit
700: Control unit
800: Housing unit
850: Relay Antenna
870: Photovoltaic cell
900: Switching unit
910: First switch
930: Second switch

What is claimed is:

1. An RF signal conversion device comprising:
   a first antenna configured to transmit a terminal confirmation signal for confirming a user terminal and receive a terminal signal transmitted from the user terminal in response to the terminal confirmation signal, and receive ambient radio waves after reception of the terminal signal is completed;
   a conversion unit configured to convert the ambient radio waves received through the first antenna into DC electricity;
   an energy storage unit configured to store the DC electricity output from the conversion unit;
   a control unit configured to operate using the DC electricity stored in the energy storage unit, output the terminal confirmation signal, and convert the terminal signal received through the first antenna into a first RF signal that can be processed by an RF card reader;
   a first switch configured to be connected to the first antenna, and form a path for transmitting the terminal signal to the control unit through the first antenna after the terminal confirmation signal is output to the first antenna, and a path for transmitting the ambient radio waves to the conversion unit after the control unit checks completion of receiving the terminal signal;
   a second switch configured to form a path for transmitting the first RF signal to the RF card reader under the control of the control unit; and
   a second antenna configured to be connected to the second switch to emit the first RF signal transmitted through the second switch to the RF card reader,
   wherein after checking completion of receiving the terminal signal, the control unit controls the second switch to transfer the second RF signal for an operation of the RF card, which is received from the RF card reader through the second antenna, to the conversion unit.

2. The device according to claim 1, wherein the control unit controls the first switch to transfer the terminal confirmation signal through the first antenna before receiving the terminal signal transmitted from the user terminal, and receives the terminal signal corresponding to the terminal confirmation signal through the first antenna while maintaining a switching state of the first switch.

3. The device according to claim 2, wherein in a third section after a first section of transmitting the terminal confirmation signal and a second section of receiving the terminal signal, the control unit changes the switching state of the first switch to transfer the ambient radio waves received through the first antenna to the conversion unit.

4. The device according to claim 1, further comprising a housing unit provided with the first antenna, the second antenna, the conversion unit, the energy storage unit, the control unit, the first switch, and the second switch, wherein the housing unit is configured to be attached to a surface of the RF card reader where an RF card may approach or contact.

5. The device according to claim 4, further comprising a relay antenna configured to transfer an RF card signal of the RF card to the RF card reader, wherein the relay antenna is provided in the housing unit.

6. The device according to claim 1, further comprising a photovoltaic cell for converting external light into electrical energy, wherein the photovoltaic cell is configured to transfer the converted electrical energy to the conversion unit.

7. An RF signal conversion device comprising:
an antenna unit configured to receive a terminal signal transmitted from a user terminal and receive ambient radio waves after reception of the terminal signal is completed;
a conversion unit configured to convert the ambient radio waves received through the antenna unit into DC electricity;
an energy storage unit configured to store the DC electricity output from the conversion unit;
a control unit configured to operate using the DC electricity stored in the energy storage unit, and convert the terminal signal received through the antenna unit into a first RF signal that can be processed by an RF card reader; and
a switching unit configured to be connected to the antenna unit, and form a path for transmitting the first RF signal to the RF card reader under the control of the control unit, and a path for transferring the ambient radio waves to the conversion unit under the control of the control unit after checking completion of receiving the terminal signal,
wherein the switching unit is configured to form a path for transferring a second RF signal transmitted from the RF card reader to the conversion unit after completion of receiving of the terminal signal is checked.

8. The device according to claim 7, further comprising a housing unit provided with the antenna unit, the conversion unit, the energy storage unit, the control unit, and the switching unit, wherein the housing unit is configured to be attached to a surface of the RF card reader where an RF card may approach or contact.

9. The device according to claim 8, further comprising a relay antenna configured to transfer an RF card signal of the RF card to the RF card reader, wherein the relay antenna is provided in the housing unit.

10. The device according to claim 7, further comprising a photovoltaic cell for converting external light into electrical energy, wherein the photovoltaic cell is configured to transfer the converted electrical energy to the conversion unit.

* * * * *